(No Model.)
G. W. LARAWAY.
MACHINE FOR MAKING PAILS.
No. 504,881. Patented Sept. 12, 1893.
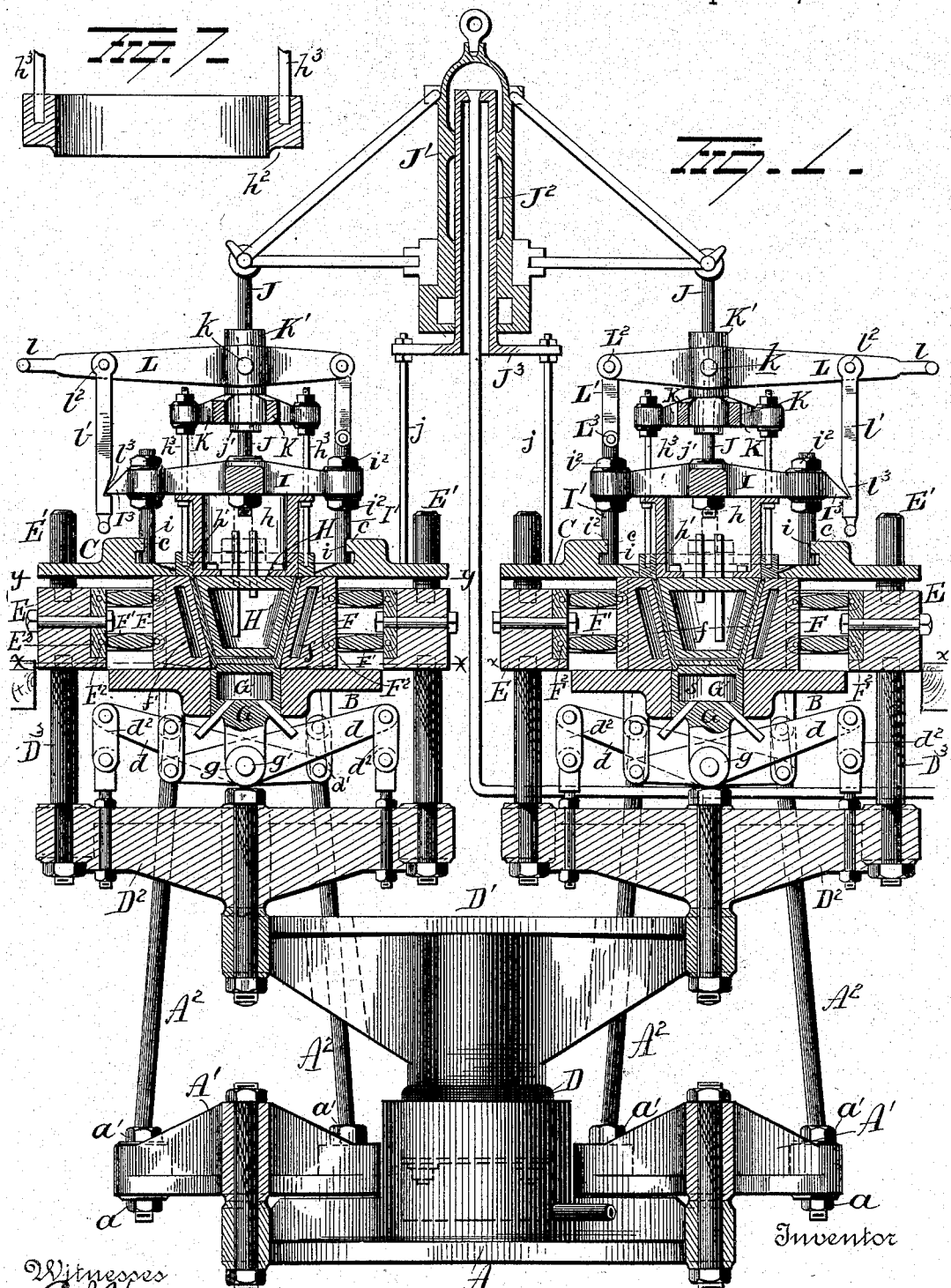

(No Model.) 4 Sheets—Sheet 2.
G. W. LARAWAY.
MACHINE FOR MAKING PAILS.
No. 504,881. Patented Sept. 12, 1893.
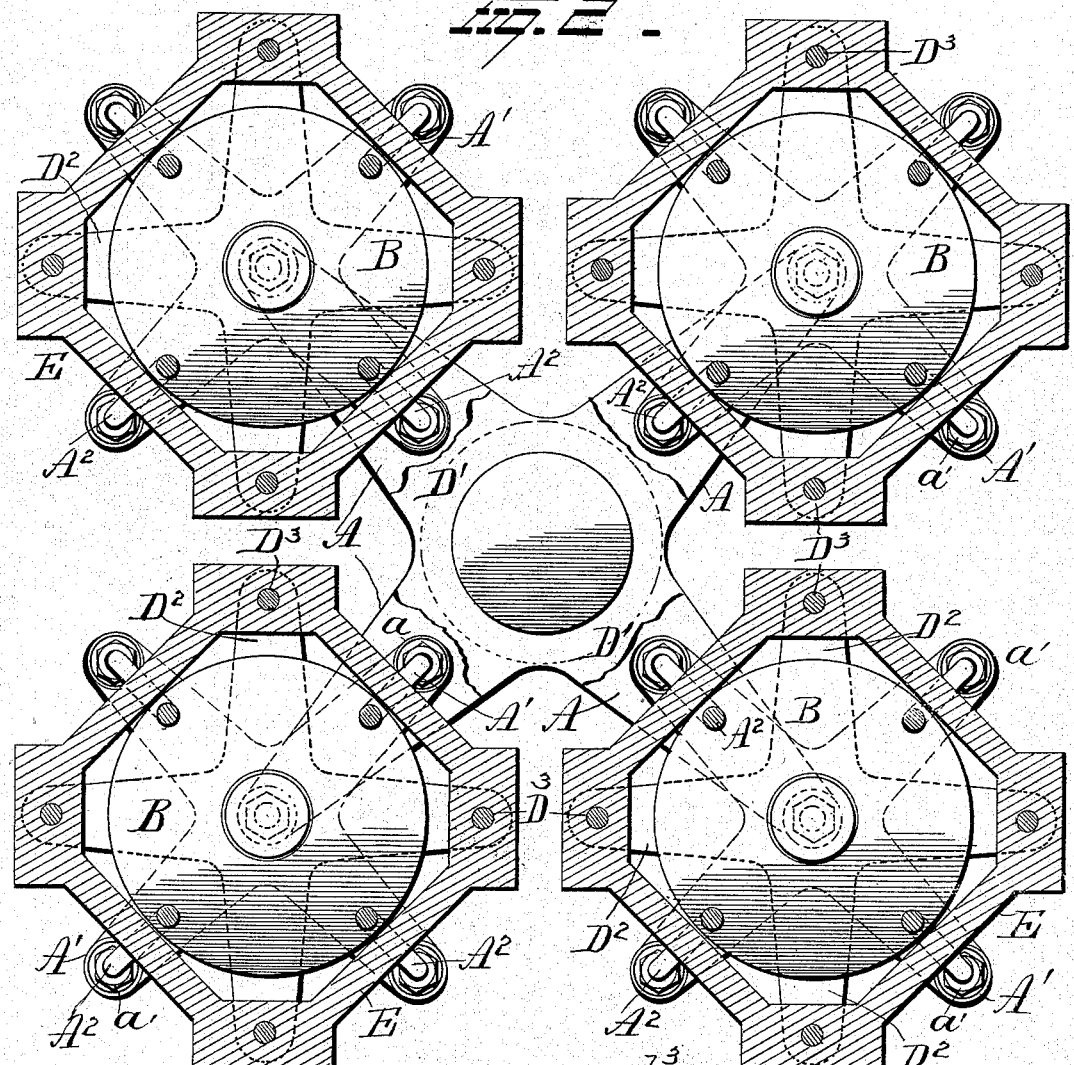
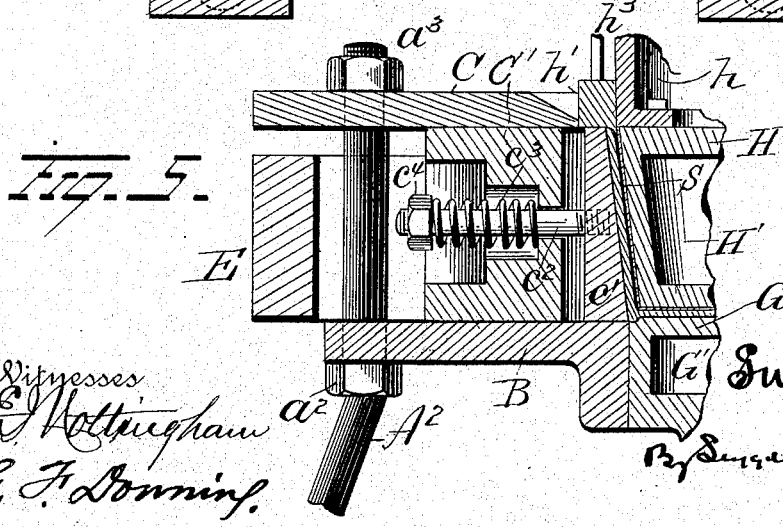
Witnesses
E. Nottingham
G. F. Downing
Inventor
G. W. Laraway
By Siggett & Siggett
Attorneys (No Model.) 4 Sheets—Sheet 3.

G. W. LARAWAY.
MACHINE FOR MAKING PAILS.

No. 504,881. Patented Sept. 12, 1893.

Witnesses
E. N. Nottingham
G. F. Downing

Inventor
G. W. Laraway
By Leggett & Leggett
Attorneys (No Model.) 4 Sheets—Sheet 4.
G. W. LARAWAY.
MACHINE FOR MAKING PAILS.
No. 504,881. Patented Sept. 12, 1893.
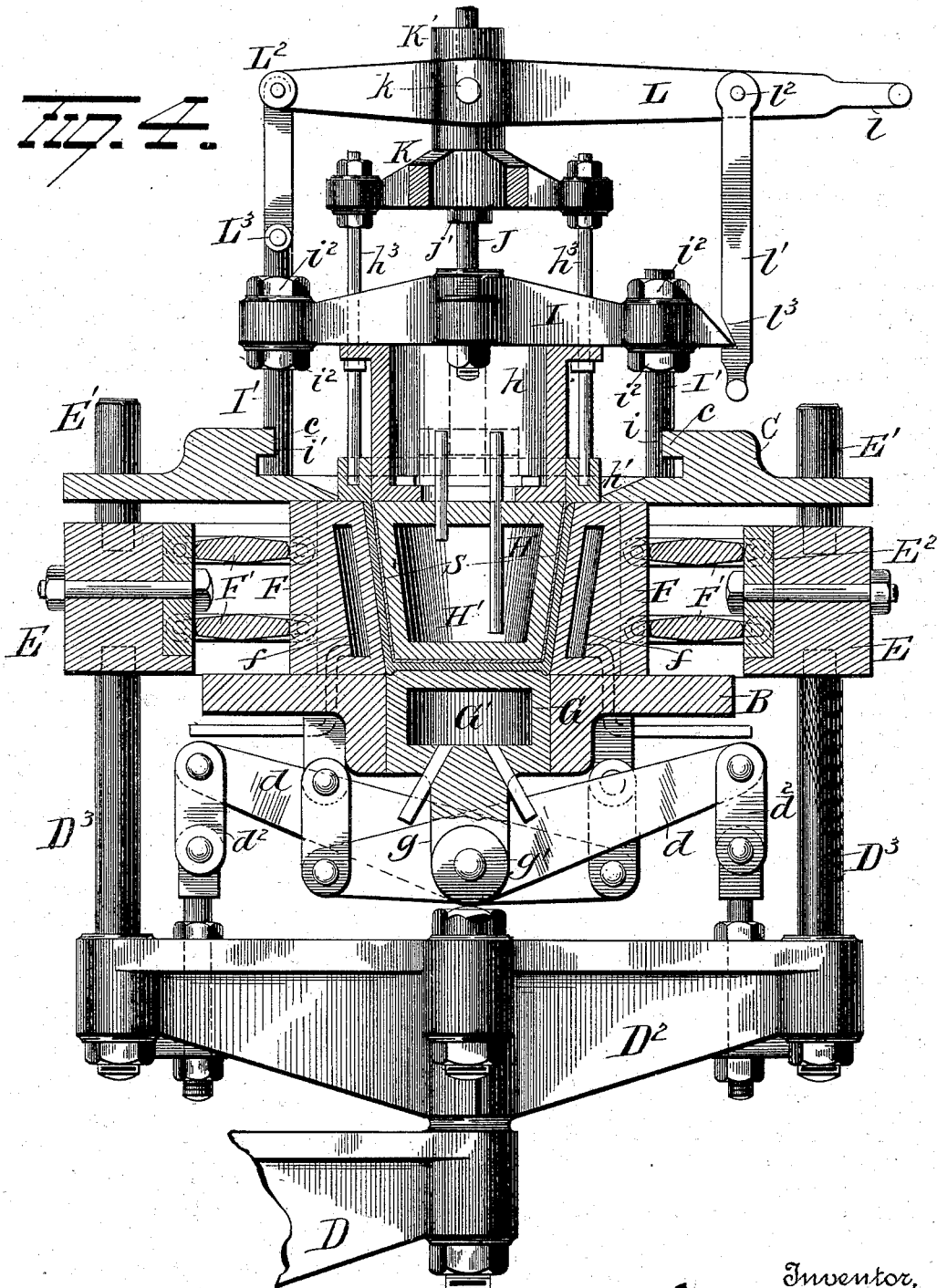
Witnesses:
E. J. Nottingham
G. F. Downing
Inventor,
G. W. Laraway.
By Leggett & Leggett
Attorneys.

UNITED STATES PATENT OFFICE.

GEORGE W. LARAWAY, OF HARTFORD, CONNECTICUT, ASSIGNOR OF ONE-HALF TO JOSIAH E. WEST, OF ST. CLOUD, MINNESOTA.

MACHINE FOR MAKING PAILS.

SPECIFICATION forming part of Letters Patent No. 504,881, dated September 12, 1893.

Application filed September 3, 1890. Serial No. 363,799. (No model.)

*To all whom it may concern:*

Be it known that I, GEORGE W. LARAWAY, of Hartford, in the county of Hartford and State of Connecticut, have invented certain new and useful Improvements in Machines for Making Pails; and I do hereby declare the following to be a full, clear, and exact description of the invention, such as will enable others skilled in the art to which it pertains to make and use the same.

My invention relates to improvements in machines for manufacturing pails, tubs and other similar vessels, in which preferably four presses are arranged in circular order, and are simultaneously operated by one hydraulic cylinder in compressing the vessel and the four presses are simultaneously opened and closed from above by means of a four-armed hydraulic crane. My invention also relates to the details of construction hereinafter described and pointed out in the claims.

Figure 3:
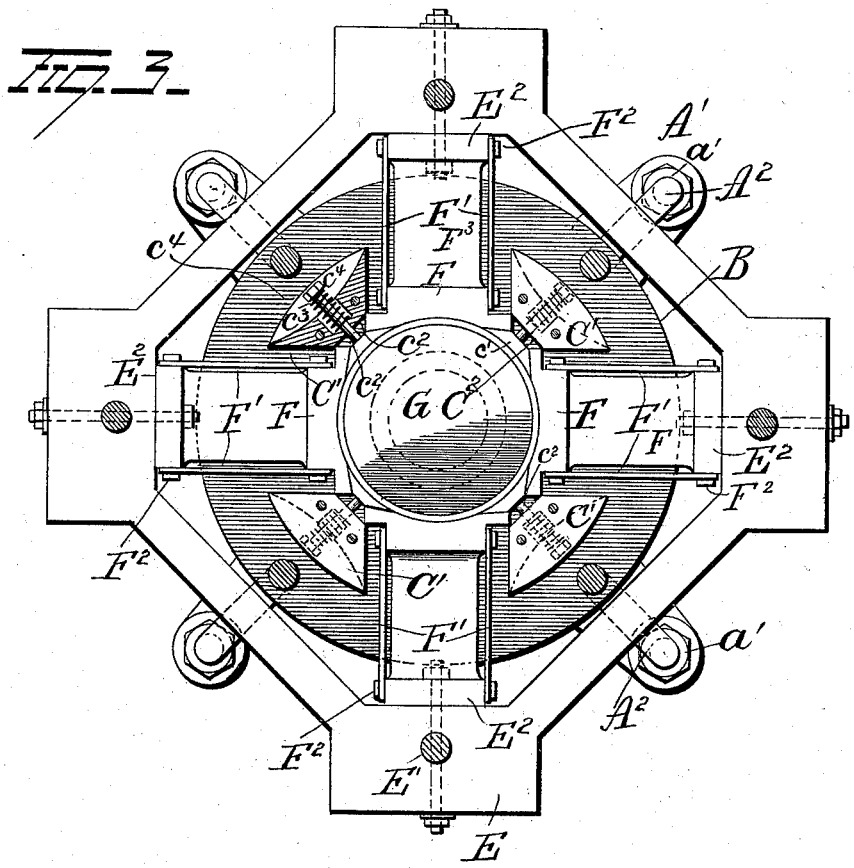
Figure 6:
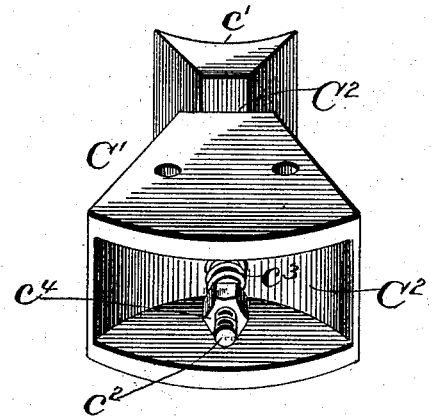

In the accompanying drawings, Figure 1 is a view in side elevation partly in section exhibiting the entire internal mechanism. Fig. 2 is a horizontal section on line $x-x$ of Fig. 1. Fig. 3 is an enlarged horizontal sectional view of one of the presses detached from the machine on line $y-y$ of Fig. 1. Fig. 4 is an enlarged vertical section of one side of the machine showing one mold with its connected mechanism. Fig. 5 is an enlarged sectional view through one of the blocks C' and one plate $c'$, and Fig. 6 is a view in rear perspective of block C' and plate $c'$, and Fig. 7 is a detail in section enlarged of ring $h'$.

The press mechanism is preferably quadrupled, in which case A represents a large heavy four-armed spider, that serves as a supporting-base for the entire machine—that is to say, for the four presses. Mounted on, and rigidly secured to the extremes of spider A, are the four four-armed spiders A'. The four extremes of each spider A' are connected by heavy metal bars or legs, $A^2$, with the respective tables B of the different presses, these bars $A^2$ also extending up through the top plates C of the different presses.

Each table B and the plate C above it, are separated or blocked apart by means of four triangular blocks C' hereinafter described, and by means of nuts $a^2$ $a^3$, on bars $A^2$ respectively, below the table and above plate C. These members B, C and C', that constitute the principal parts of the frame-work of each press, are rigidly held together and supported in proper position. Bars $A^2$ are also provided with nuts, $a$ $a'$, located respectively above and below and engaging the spider A'. The hub of spider A is bored from the top downward and fitted with a plunger, D, these members constituting a hydraulic-cylinder for simultaneously operating the four presses. Plunger D, is connected with the four-armed spider D', and on the extremes of the latter are mounted and rigidly secured the four four-armed spiders $D^2$. The extremes of spiders $D^2$ are connected by heavy rods $D^3$ with heavy metal rings, E, one ring being provided for each press, whereby the rings of the four presses are simultaneously actuated vertically by the movement of plunger D aforesaid. Each ring E is provided with steady-pins E', preferably four in number, and located at equal intervals around the ring, these steady-pins fitting nicely in vertical holes in plates C, and serve as guides for the rings. The four presses are supposed to be alike and a description of one will suffice for all.

Located between table B and plate C and operating between the four triangular blocks C' are the four external mold-sections F, these mold-sections being adapted to reciprocate in radial directions and when they are moved inward to their respective places they constitute the external wall of a conical mold, in which the pail or other vessel is formed. Power is communicated to the mold-sections F through the medium of flat plates or arms $F^3$ which are knuckled at their ends in sockets formed to receive them, in the mold sections and ring E, respectively. Links F' in addition to these arms or plates $F^3$ are permanently connected at their ends to the mold-sections and ring whereby to draw the mold sections back when ring E is made to descend. For convenience in construction, metal blocks $E^2$, are pierced laterally to receive the pivotal pin $F^2$ on which the outer ends of the links operate or are pivoted. Each block, $E^2$, is secured by a bolt to the inner surface of ring E in position, respectively, opposite the different mold-sections F. The mold-sections F have chambers $f$ cored therein for heating purposes, and hence, each mold-section is provided in case of steam-heating with induction and eduction pipes that connect with flexible pipes to allow the mold-sections to be moved as aforesaid. In case the mold-sections are heated by gas somewhat different arrangement of pipes would be necessary, but persons skilled in the art would have no difficulty in arranging the pipes according to the method of heating. The bottom of the pail is formed externally by plunger G, this plunger fitting nicely in a corresponding vertical hole in table B, this plunger having a heating chamber G' cored therein, and being provided with suitable pipe or pipes, according to the method of heating, and such pipe or pipes having flexible sections to accommodate the movements of the plunger. Plunger G is moved up and down simultaneously with ring E, but the movement of the plunger, as compared with the movement of the ring E and spider $D^2$, is greatly reduced and this is accomplished in the following manner: A depending arm or lug $g$ of the plunger operates between and is pivoted to levers $d\,d$ by means of a strong pin $g'$. The short arms of levers $d$ are connected by links $d'$ with table B. The long arms of these levers are connected by links $d^2$ with spider $D^2$. Usually the short arms of levers $d\,d$ are about one-third the length of these levers, in which case the movement of spider $D^2$, as compared with the movement of the plunger, would be as three to one. The object in making the arms of the levers in these proportions is to regulate the speed and extent of movement of one connected part to the other, at the same time imparting the required power, for it is evident that the spiders $D^2$ must travel much farther and faster than plunger G. These relative speeds and extent of travel are regulated by the levers $d, d$ and the lengths of their arms.

H is an inverted conical former for shaping the inside of the pail, this former having a chamber H', cored therein for heating purposes and of course provided with suitable pipe or pipes for the purpose. To former H is bolted cylinder, $h$, and this cylinder in turn is bolted to the four-armed spider I. The spider is mounted and may revolve on rod J, this rod connecting with one arm of a four-armed hydraulic crane J'. The cylinder of this crane is movable and is provided with a stationary plunger $J^2$. The latter is integral or connected with a bed-plate, $J^3$, that in turn is supported by bars $j$, the latter serving as legs for the hydraulic crane, these legs connecting with plates C of the different presses. By operating the hydraulic crane the formers H of the different presses are lifted out from the mold for removing the pail, and are simultaneously returned to their places by reversing the crane. Plate C has four overhanging lugs $c$ presenting inward, and spider I has depending bars I' notched at $i$ to receive lug $c$. In raising or lowering spider I the latter is turned on its axis enough to disengage notches $i$ from lug $c$. Bars I' are provided with nuts $i^2$, respectively, above and below the spider, and by manipulating these nuts bars I' are adjusted vertically so that in lowering spider I until bars I' engage plate C former H will be in its proper position in the mold, after which by rotating spider I a short distance notches $i$ engage lugs $c$ and thereby lock the spider and prevent the former H from lifting with the upward movement of plunger G. The outside of cylinder $h$ is turned off nicely so as to fit the bore of ring $h'$, this ring serving as a gate, by raising which material is admitted to the mold. The lower end of ring $h'$, and near the inner edge thereof, is provided with a slight annular and rounded groove, $h^2$, (see Fig. 7,) that gives a round finish to the top edge of the pail. Ring $h'$ is connected by rods $h^3$ with spider K, the latter being mounted loosely on rod J above spider I, rods $h^3$ extending up between the arms of spider I. Rod J is provided with a collar, $j'$, which constitutes a stop upon which spider K rests when in its depressed position and both the ring and former H are raised and lowered with the upward and downward movement of the hydraulic crane. When former H is in position in the mold the lower end of ring $h'$ is flush with the under face of plate C, and from such position it becomes necessary to raise the ring in order to feed the material into the mold. For this purpose devices are provided as follows: Spider K has a long upwardly-projecting hub or sleeve, K', to which is pivoted at $k$ lever L, the lever having a slotted section adapted to embrace hub K'. The inner and shorter arm of this lever is connected by links L' L', arranged in pairs, with one of bars I', the links being pivoted to the lever and to the bars respectively, at $L^2$ and $L^3$. The outer and longer arm of lever L terminates in a handle, $l$, by elevating which ring $h'$ is raised a few inches. For holding down the ring $h'$ during the compression of the pail a depending arm $l'$ is pivoted at $l^2$ to lever L. This arm has a notch, $l^3$, adapted to engage the opposing end $I^3$ of one of the arms of spider I, by which engagement ring $h'$ is locked in its depressed position, thereby closing the upper end of the mold. Each block C' has necessarily two of its sides at right angles to each other, to wit,—the two sides thereof that oppose the ends of the adjacent mold-sections F, in order to form guides between which said mold sections are confined as they move in and out. The block, at the inner angle thereof, is cut away for an inch or so, as shown at $C^2$ (see Figs. 3 and 5) and to this flattened surface is applied a thin metal plate, $c'$, extending up and down the block approximately the length thereof. This plate is attached to a rod, $c^2$, that extends radially outward with an easy fit through a hole in the block. Outside the block a spring, $c^3$, is coiled around the rod, this spring bearing against the head or nut $c^4$ of the rod, and bearing against the outer side of the block, the tension of the spring tending to draw plate $c'$ and rod $c^2$ outward. Plate $c'$ overlaps the line of the adjacent mold-section F, and when these latter are advanced inward they carry the plate along with them, and when the mold-sections are reversed the recoil of spring $c^3$ moves plate $c'$ outward. There are of course four of these overlapping plates $c'$ and they prevent either creases or ridges being formed in the pail at the joints or intersections of the different mold-sections. The material of which the pails are made is supposed to be a mixture of rosin, coal tar and fibrous pulp, these ingredients having been reduced to a powder and thoroughly mixed, and are introduced dry into the mold. The material is usually weighed out in suitable quantities and placed in pails or other vessels suitable for the purpose and is poured by hand into the different molds. With plunger G depressed and with mold-sections F drawn outward and with former H elevated, enough of the material is placed in the mold to form the bottom of the pail. Next, former H is lowered to its position in the mold, after which plate or ring $h'$ is raised and the balance of the material is placed in the mold. Ring $h'$ is then lowered and fastened, thus closing the mold, after which the hydraulic cylinder below is set in motion, whereby the plunger G is elevated and the mold-sections are advanced inward. The heat of the mold, together with the great pressure applied, renders the material somewhat plastic, so that as the pail is formed into shape the material thereof becomes homogeneous, and after the pail is removed from the press and is cooled it becomes hard, strong and durable, and is impervious to moisture. The mold, before the material is introduced, should be well lubricated with, for instance, an admixture of pulverized soapstone and linseed oil to prevent the pail from sticking to the mold. Preferably former H is provided with a casing, S, of very thin sheet metal, see Fig. 5, in which case when former H is withdrawn the casing is left inside the pail, and by means of which the hot and somewhat plastic pail is removed more easily without injury, and is set aside where it will not be disturbed until it cools. After the pail is thus set aside the casing may be easily removed by pouring a little cold water therein, as this will almost instantly cause the metal of the casing to shrink and cleave from the pail, after which the casing may again be applied to former H. However to expedite matters at least two of these casings should be provided for each former H.

To operate the machine to the best advantage one man should be provided to operate the hydraulic cylinder and the hydraulic crane and a man and a boy should be provided for each of the different presses, and with these five men and four boys the machine can be operated with dispatch, and the pails turned out in great numbers per day.

What I claim is—

1. The combination with one or more presses comprising each, mold sections, plunger and former, of a reciprocating ring connected with the side and plunger sections of the molds, whereby the ring and sections move simultaneously, the connecting mechanism between the plungers and rings comprising spiders and levers, the latter of such length and connection that the speeds of the ring and plunger are unequal, substantially as set forth.

2. The combination with a table, top plate and spacing blocks located between the table and top plate, the adjacent faces of these blocks parallel with each other and constituting guides, of reciprocating mold sections located between these guide faces the top plate and table, a reciprocating ring connected with these mold sections and reciprocating at right angles thereto, a reciprocating plunger, spiders and levers connecting the plunger with the spider whereby the two are reciprocated simultaneously, substantially as set forth.

3. The combination with a table having an opening formed therein, a top plate, said parts properly spaced apart, and means for securing them together, of side mold sections located between the table and top plate, a plunger operating in the opening in the table, a reciprocating ring to which the side mold sections are connected, a spider, and lever connected with the table, the plunger and the spider, substantially as set forth.

4. The combination with a spider having several arms, spiders $A'$ connected with each of said arms, tables, and rods extending from the ends of spiders $A'$ to the tables and secured to the latter, of a plunger having arms, spiders $D^2$ connected with these arms, rings connected to said spiders $D^2$, side mold-sections located on the tables and connected with the rings, bottom mold sections operating in holes in the tables, and levers pivotally connected with the tables the bottom mold-sections and the spiders $D^2$, substantially as set forth.

5. The combination with a table, top plate, means for holding them apart, and mold sections adapted to reciprocate between the table and top plate, of a rotary reciprocating spider, a core, a cylinder connecting the core to the spider, a ring mounted on the cylinder, and adapted to reciprocate thereon, the lower face of this ring adapted to give the finish to the upper edge of the pail or article being formed, substantially as set forth.

6. The combination with top plate having overhanging lugs, of rotary reciprocating spider carrying depending rods, having notches therein adapted to be engaged by the lugs, a mold core or former connected with the spider, and mold sections co-operating with said core, substantially as set forth.

7. The combination with a top-plate having overhanging lugs, of reciprocating rotary spider having notched depending rods adapted to be locked to the top plate when rotated, a cylinder secured to the spider, a former secured to the cylinder, a ring mounted on the cylinder, and means for locking the ring in position relative to the former and cylinder, substantially as set forth.

8. The combination with mold sections, of an inside former, a spider connected therewith, a cylinder to which the former is secured, a former ring mounted on the cylinder, means for locking the former in place, a spider connected with the former ring, a lever for operating the latter spider, and means for locking this lever to the former, substantially as set forth.

9. The combination, with a series of presses of the variety indicated arranged in circular order, each press having a former constituting the inner wall of the mold, of a hydraulic crane centrally located and having arms operatively connected with the different formers, whereby the latter may be simultaneously raised or lowered, substantially as set forth.

10. In combination, a series of presses of the variety indicated, each press having a former constituting the inner wall of its mold, each former being operatively connected with the spider, the different spiders being, respectively, journaled on rods depending from the arms of the hydraulic crane, each spider having depending locking-bars adapted also to serve as stops in lowering the former into the mold, substantially as set forth.

In testimony whereof I sign this specification, in the presence of two witnesses, this 17th day of June, 1890.

GEORGE W. LARAWAY.

Witnesses:
CHAS. H. DORER,
WARD HOOVER.